(12) United States Patent
Nakagawa et al.

(10) Patent No.: US 11,293,075 B2
(45) Date of Patent: Apr. 5, 2022

(54) HOT-PRESS FORMING PART AND METHOD OF MANUFACTURING SAME

(71) Applicant: JFE STEEL CORPORATION, Tokyo (JP)

(72) Inventors: Koichi Nakagawa, Tokyo (JP); Yoshikiyo Tamai, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 68 days.

(21) Appl. No.: 16/894,886

(22) Filed: Jun. 8, 2020

(65) Prior Publication Data
US 2020/0299801 A1 Sep. 24, 2020

Related U.S. Application Data

(62) Division of application No. 16/082,094, filed as application No. PCT/JP2017/001110 on Jan. 13, 2017, now Pat. No. 10,858,718.

(30) Foreign Application Priority Data

Mar. 29, 2016 (JP) .............................. JP2016-066708
Nov. 30, 2016 (JP) .............................. JP2016-233413

(51) Int. Cl.
  *C21D 9/46* (2006.01)
  *C22C 38/06* (2006.01)
  (Continued)

(52) U.S. Cl.
  CPC ................ *C21D 9/46* (2013.01); *B32B 15/01* (2013.01); *C21D 1/26* (2013.01); *C21D 6/005* (2013.01);
  (Continued)

(58) Field of Classification Search
  CPC . C21D 9/46; C21D 1/26; C21D 6/005; C21D 6/008; C21D 8/0205; C21D 8/021; C21D 8/0226; C21D 8/0236; C21D 8/0268; C22C 38/001; C22C 38/002; C22C 38/005; C22C 38/02; C22C 38/04; C22C 38/06;
  (Continued)

(56) References Cited

U.S. PATENT DOCUMENTS 10,253,386 B2   4/2019   Miyoshi et al.
10,384,254 B2   8/2019   Nakajima et al.
(Continued)

FOREIGN PATENT DOCUMENTS

CN   101638749 A   2/2010
CN   104011240 A   8/2014
(Continued)

OTHER PUBLICATIONS

Jun. 15, 2020, Office Action issued by the U.S. Appl. No. 16/082,094.
(Continued)

*Primary Examiner* — Scott R Kastler
(74) *Attorney, Agent, or Firm* — Kenja IP Law PC

(57) ABSTRACT

A steel sheet for hot press comprises: a predetermined chemical composition; and a steel microstructure that includes ferrite and cementite and in which Mnθ/Mnα is 1.4 or more, where Mnα is a Mn concentration of the ferrite and Mnθ is a Mn concentration of the cementite.

8 Claims, 1 Drawing Sheet

(51) Int. Cl.

| | | |
|---|---|---|
| *C22C 38/02* | (2006.01) | |
| *C22C 38/04* | (2006.01) | |
| *C21D 6/00* | (2006.01) | |
| *C22C 38/00* | (2006.01) | |
| *C23C 2/06* | (2006.01) | |
| *C23C 2/02* | (2006.01) | |
| *C22C 38/12* | (2006.01) | |
| *C21D 1/26* | (2006.01) | |
| *C22C 38/38* | (2006.01) | |
| *C23C 2/12* | (2006.01) | |
| *C22C 38/60* | (2006.01) | |
| *C22C 38/16* | (2006.01) | |
| *C21D 8/02* | (2006.01) | |
| *C22C 38/14* | (2006.01) | |
| *C23C 2/40* | (2006.01) | |
| *C22C 38/08* | (2006.01) | |
| *B32B 15/01* | (2006.01) | |

(52) U.S. Cl.
CPC ............ *C21D 6/008* (2013.01); *C21D 8/021* (2013.01); *C21D 8/0205* (2013.01); *C21D 8/0226* (2013.01); *C21D 8/0236* (2013.01); *C21D 8/0268* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/38* (2013.01); *C22C 38/60* (2013.01); *C23C 2/02* (2013.01); *C23C 2/06* (2013.01); *C23C 2/12* (2013.01); *C23C 2/40* (2013.01); *C21D 2211/003* (2013.01); *C21D 2211/005* (2013.01)

(58) Field of Classification Search
CPC ......... C22C 38/08; C22C 38/12; C22C 38/14; C22C 38/16; C22C 38/60; B32B 15/01; C23C 2/02; C23C 2/06; C23C 2/12; C23C 2/40
See application file for complete search history.

(56) References Cited

U.S. PATENT DOCUMENTS

| | | | |
|---|---|---|---|
| 2014/0065007 A1 | 3/2014 | Naitou et al. | |
| 2014/0308156 A1 | 10/2014 | Posco | |
| 2014/0332123 A1 | 11/2014 | Nakagawa et al. | |
| 2015/0027596 A1* | 1/2015 | Miyoshi ............... | C22C 38/00 148/533 |
| 2017/0306437 A1 | 10/2017 | Nakagawa et al. | |
| 2017/0335423 A1 | 11/2017 | Murakami et al. | |

FOREIGN PATENT DOCUMENTS

| | | |
|---|---|---|
| CN | 104136650 A | 11/2014 |
| EP | 2778247 A1 | 9/2014 |
| EP | 3181715 A1 | 6/2017 |
| EP | 3366797 A1 | 8/2018 |
| EP | 3366798 A1 | 8/2018 |
| JP | 2003213370 A | 7/2003 |
| JP | 2004211147 A | 7/2004 |
| JP | 2010065293 A | 3/2010 |
| JP | 2012041613 A | 3/2012 |
| JP | 2012237048 A | 12/2012 |
| JP | 2013079441 A | 5/2013 |
| JP | 2014019941 A | 2/2014 |
| JP | 2015503023 A | 1/2015 |
| KR | 1020160027146 A | 3/2016 |
| WO | 2013132816 A1 | 9/2013 |
| WO | 2016063467 A1 | 4/2016 |
| WO | 2016080534 A1 | 5/2016 |

OTHER PUBLICATIONS

Apr. 18, 2017, International Search Report issued in the International Patent Application No. PCT/JP2017/001110.

Apr. 9, 2020, Office Action issued by the China National Intellectual Property Administration in the corresponding Chinese Patent Application No. 201780019325.6 with English language concise statement of relevance.

Aug. 22, 2019, the Extended European Search Report issued by the European Patent Office in the corresponding European Patent Application No. 19176359.8.

Dec. 3, 2018, the Partial Supplementary European Search Report issued by the European Patent Office in the corresponding European Patent Application No. 17773498.5.

Feb. 5, 2019, the Extended European Search Report issued by the European Patent Office in the corresponding European Patent Application No. 17773498.5.

Mar. 5, 2020, Communication pursuant to Article 94(3) EPC issued by the European Patent Office in the corresponding European Patent Application No. 17773498.5.

Oct. 7, 2019, Office Action issued by the Korean Intellectual Property Office in the corresponding Korean Patent Application No. 10-2018-7027653 with English language concise statement of relevance.

Oct. 9, 2019, Office Action issued by the China National Intellectual Property Administration in the corresponding Chinese Patent Application No. 201780019325.6 with English language search report.

Aug. 31, 2020, Office Action issued by the China National Intellectual Property Administration in the corresponding Chinese Patent Application No. 201780019325.6 with English language concise statement of relevance.

Yu Zhao et al., Electrical Steel, Sep. 30, 2012, p. 381.

* cited by examiner

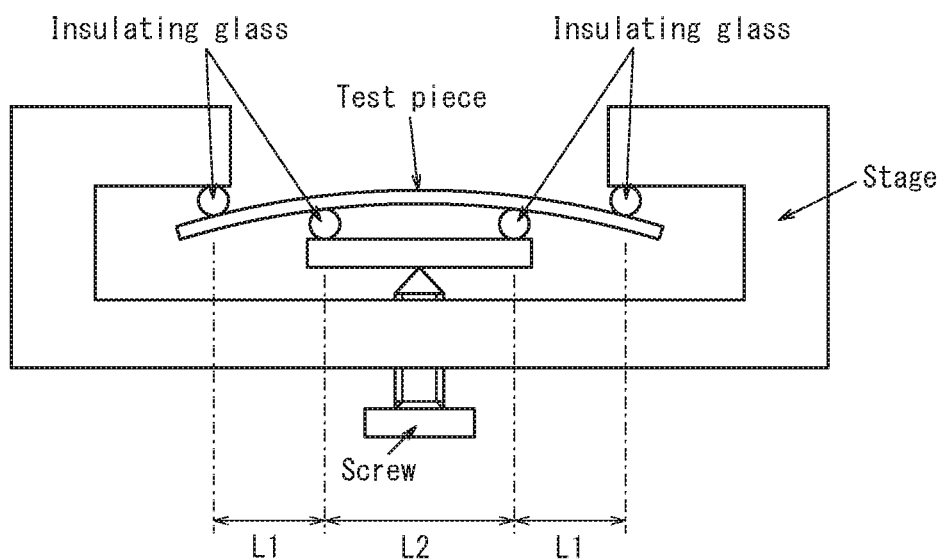

HOT-PRESS FORMING PART AND METHOD OF MANUFACTURING SAME

CROSS-REFERENCE TO RELATED APPLICATION

This application is a divisional application of U.S. application Ser. No. 16/082,094 filed Sep. 4, 2018, now U.S. Pat. No. 10,858,718, which is a National Stage Application of PCT/JP2017/001110 filed Jan. 13, 2017, which claims priority based on Japanese Patent Application No. 2016-066708 filed Mar. 29, 2016, and Japanese Patent Application No. 2016-233413 filed Nov. 30, 2016. The disclosures of the prior applications are hereby incorporated by reference herein in their entirety.

TECHNICAL FIELD

The present disclosure relates to a steel sheet for hot press and a method of manufacturing the same, and a hot-press forming part and a method of manufacturing the same. The hot-press forming part is a press forming part obtained by hot-press forming a steel sheet.

BACKGROUND

Recent years have seen strong demand to improve the fuel efficiency of automobiles, for global environment protection. This has led to need for weight reduction of automotive bodies. To ensure safety even with thinner automotive parts, steel sheets as blank sheets of such automotive parts need to have high strength.

However, strengthening a steel sheet typically causes lower press formability. Hence, problems such as difficulty in press forming and degraded shape-fixability arise in the manufacture of automotive parts using high-strength steel sheets as blank sheets.

In view of such problems, a technique of manufacturing a high-strength automotive part by applying a hot-press process has been proposed. The hot-press process is a technique of, after heating a steel sheet to an austenite region, conveying the steel sheet to a press machine and, in the press machine, i.e. a tool for press forming, press-forming the steel sheet into a part of a desired shape and simultaneously rapid-cooling the steel sheet. In the cooling (rapid cooling) process in the tool for press forming, the microstructure of the part undergoes phase transformation from austenite to martensite. A high-strength part of a desired shape is thus obtained. The "hot-press process (hot-press forming)" is also referred to as "hot forming", "hot stamping", "die quenching", etc.

Demand to improve the crash-worthiness of automotive parts has also been growing recently, in order to ensure the safety of drivers and passengers. To meet this demand, the ability to absorb energy upon crash (crash energy absorption performance) needs to be enhanced. From this perspective, it is effective to increase the uniform elongation of an automotive part so as to prevent a fracture of the automotive part upon crash and suppress a decrease in crash energy absorption performance. There has thus been strong demand to develop hot-press forming parts having excellent uniform elongation as well as high strength.

In view of this demand, for example, JP 2013-79441 A (PTL 1) discloses a hot-press forming part obtained by press forming a thin steel sheet by a hot-press forming method. This hot-press forming part includes: a chemical composition containing, in mass %, C: 0.15% to 0.35%, Si: 0.5% to 3%, Mn: 0.5% to 2%, P: 0.05% or less, S: 0.05% or less, Al: 0.01% to 0.1%, Cr: 0.01% to 1%, B: 0.0002% to 0.01%, Ti: (N content)×4% to 0.1%, and N: 0.001% to 0.01%, with a balance consisting of Fe and inevitable impurities; and a microstructure including, in area ratio, martensite: 80% to 97%, retained austenite: 3% to 20%, and a residual microstructure: 5% or less. PTL 1 states that, with this technique, the microstructure of the hot-press forming part can be formed as a metallic microstructure in which an appropriate amount of retained austenite remains by appropriately controlling press forming conditions, and as a result a hot-press forming part having higher ductility can be yielded.

JP 2010-65293 A (PTL 2) discloses a hot-press forming part having excellent ductility. This hot-press forming part includes: a composition containing, in mass %, C: 0.20% to 0.40%, Si: 0.05% to 3.0%, Mn: 1.0% to 4.0%, P: 0.05% or less, S: 0.05% or less, Al: 0.005% to 0.1%, and N: 0.01% or less, with a balance consisting of Fe and inevitable impurities; and a microstructure in which the area ratio of ferrite phase is 5% to 55% and the area ratio of martensite phase is 45% to 95% with respect to the whole microstructure, and the mean grain size of ferrite phase and martensite phase is 7 μm or less. PTL 2 states that, with this technique, a hot-press forming part having high strength of 1470 MPa to 1750 MPa in tensile strength TS and high ductility of 8% or more in total elongation El can be yielded.

Increases in the strength of parts have induced concern about fractures caused by hydrogen, i.e. hydrogen embrittlement. Hence, there has also been demand to improve delayed fracture resistance.

In view of this demand, for example, JP 2012-237048 A (PTL 3) discloses a steel sheet for hot stamp containing, in mass %, S: 0.001% to 0.005%, REM: 0.005% to 0.03%, and O: 0.003% to 0.007%, wherein a spherical inclusion including two or more of S, O (oxygen) and REM, and having a diameter of 0.1 μm or less is dispersed.

JP 2012-41613 A (PTL 4) discloses a steel sheet for hot press containing, in mass %, C: 0.1% to 0.5%, Si: 0.05% to 2%, Mn: 0.1% to 3%, Al: 0.003% to 2%, P: 0.05% or less, S: 0.03% or less, and N: 0.01% or less, wherein Si+Al≥1.0%, and an index of hardenability that depends on chemical composition is appropriately adjusted.

CITATION LIST

Patent Literatures

PTL 1: JP 2013-79441 A
PTL 2: JP 2010-65293 A
PTL 3: JP 2012-237048 A
PTL 4: JP 2012-41613 A

SUMMARY

Technical Problem

With the techniques described in PTL 1 and PTL 2, martensite is strengthened by C to achieve high strength in the hot-press forming part. An attempt to further enhance tensile strength through this feature may result in a failure to obtain uniform elongation required in terms of improvement in crash energy absorption performance. Besides, delayed fracture resistance is not addressed by these techniques.

The technique described in PTL 3 equally has a problem in that sufficient uniform elongation required in terms of improvement in crash energy absorption performance is not necessarily obtained.

The technique described in PTL 4 has a problem in that, if attempting to enhance the tensile strength in the hot-press forming part to more than 1800 MPa, sufficient retained austenite cannot be formed, and consequently desired delayed fracture resistance and desired uniform elongation cannot be obtained.

It could therefore be helpful to provide a steel sheet for hot press that simultaneously achieves, in a hot-press forming part obtained by hot press, high strength of 1800 MPa or more in tensile strength TS, high ductility of 6.0% or more in uniform elongation uEl, and excellent delayed fracture resistance, and an advantageous method of manufacturing the steel sheet for hot press.

It could also be helpful to provide a hot-press forming part that has both high strength of 1800 MPa or more in tensile strength TS and high ductility of 6.0% or more in uniform elongation uEl and also has excellent delayed fracture resistance, and a method of manufacturing the hot-press forming part.

Here, "excellent delayed fracture resistance" denotes that, in the below-mentioned delayed fracture resistance evaluation (4-point bending test method), no fracture occurred even after immersion in a test solution for 100 hr (preferably 200 hr).

Solution to Problem

To obtain a hot-press forming part that has both high strength of 1800 MPa or more in tensile strength TS and high ductility of 6.0% or more in uniform elongation uEl and also has excellent delayed fracture resistance, we conducted studies on various factors that especially influence the uniform elongation uEl and the delayed fracture resistance. As a result, we discovered the following.

(A) To achieve a uniform elongation uEl of 6.0% or more while ensuring a tensile strength TS of 1800 MPa or more, a microstructure having an appropriate amount of retained austenite is necessary. To obtain a microstructure having an appropriate amount of retained austenite with C: less than 0.300 mass %, the Mn content needs to be 3.50 mass % or more. Mn contributes to increased strength, so that desired strength can be ensured even with C: less than 0.300 mass %.

(B) Retained austenite serves as a hydrogen occlusion site, and contributes to improved delayed fracture resistance. Thus, to improve the delayed fracture resistance, it is important to obtain a microstructure in which retained austenite having an appropriate size is dispersed, in a hot-press forming part yielded by hot press.

(C) To obtain a microstructure in which retained austenite having an appropriate size is dispersed in a hot-press forming part, it is important to increase the Mn content in a steel sheet for hot press as a blank sheet, and also, after cold rolling in a process of manufacturing the steel sheet for hot press, perform heat treatment of heating the steel sheet to a temperature range of $Ac_1-150°$ C. or more and less than $Ac_1$ point and retaining the steel sheet in the temperature range for a predetermined time to cause Mn to concentrate in cementite.

Such Mn-concentrated cementite serves as a retained austenite formation site. Consequently, a microstructure in which retained austenite having an appropriate size is dispersed can be obtained in a hot-press forming part yielded from the steel sheet for hot press.

The present disclosure is based on these discoveries and further studies.

We thus provide:

1. A steel sheet for hot press, comprising: a chemical composition containing (consisting of), in mass %, C: 0.180% or more and less than 0.300%, Mn: 3.50% or more and less than 11.0%, Si: 0.01% to 1.5%, P: 0.05% or less, S: 0.05% or less, Al: 0.005% to 0.1%, and N: 0.01% or less, with a balance consisting of Fe and inevitable impurities; and a microstructure that includes ferrite and cementite and in which Mnθ/Mnα is 1.4 or more, where Mnα is a Mn concentration of the ferrite and Mnθ is a Mn concentration of the cementite.

2. The steel sheet for hot press according to 1., wherein the chemical composition further contains, in mass %, one or more groups selected from A group: one or more selected from Ni: 0.01% to 5.0%, Cu: 0.01% to 5.0%, Cr: 0.01% to 5.0%, and Mo: 0.01% to 3.0%, B group: one or more selected from Ti: 0.005% to 3.0%, Nb: 0.005% to 3.0%, V: 0.005% to 3.0%, and W: 0.005% to 3.0%, C group: one or more selected from REM: 0.0005% to 0.01%, Ca: 0.0005% to 0.01%, and Mg: 0.0005% to 0.01%, D group: Sb: 0.002% to 0.03%, and E group: B: 0.0005% to 0.05%.

3. The steel sheet for hot press according to 1. or 2., comprising a coating layer on a surface thereof.

4. The steel sheet for hot press according to 3., wherein the coating layer is a zinc-based coating layer or an aluminum-based coating layer.

5. The steel sheet for hot press according to 4., wherein the zinc-based coating layer contains Ni: 10 mass % to 25 mass %.

6. A method of manufacturing a steel sheet for hot press, comprising: heating a slab and hot rolling the slab to obtain a hot-rolled steel sheet, the slab having a chemical composition containing, in mass %, C: 0.180% or more and less than 0.300%, Mn: 3.50% or more and less than 11.0%, Si: 0.01% to 1.5%, P: 0.05% or less, S: 0.05% or less, Al: 0.005% to 0.1%, and N: 0.01% or less, with a balance consisting of Fe and inevitable impurities; cold rolling the hot-rolled steel sheet to obtain a cold-rolled steel sheet; and performing annealing on the cold-rolled steel sheet, the annealing involving heating the cold-rolled steel sheet to a temperature range of $Ac_1-150°$ C. or more and less than $Ac_1$ point, thereafter retaining the cold-rolled steel sheet in the temperature range for 1 hr or more, and thereafter cooling the cold-rolled steel sheet.

7. The method of manufacturing a steel sheet for hot press according to 6., wherein the chemical composition further contains, in mass %, one or more groups selected from A group: one or more selected from Ni: 0.01% to 5.0%, Cu: 0.01% to 5.0%, Cr: 0.01% to 5.0%, and Mo: 0.01% to 3.0%, B group: one or more selected from Ti: 0.005% to 3.0%, Nb: 0.005% to 3.0%, V: 0.005% to 3.0%, and W: 0.005% to 3.0%, C group: one or more selected from REM: 0.0005% to 0.01%, Ca: 0.0005% to 0.01%, and Mg: 0.0005% to 0.01%, D group: Sb: 0.002% to 0.03%, and E group: B: 0.0005% to 0.05%.

8. The method of manufacturing a steel sheet for hot press according to 6. or 7., comprising forming a coating layer on a surface of the steel sheet for hot press, after the annealing.

9. The method of manufacturing a steel sheet for hot press according to 8., wherein the coating layer is a zinc-based coating layer or an aluminum-based coating layer.

10. The method of manufacturing a steel sheet for hot press according to 9., wherein the zinc-based coating layer contains Ni: 10 mass % to 25 mass %.

11. The method of manufacturing a steel sheet for hot press according to any one of 8. to 10., wherein a coating weight of the coating layer is 10 $g/m^2$ to 90 $g/m^2$ per side.

12. A hot-press forming part, comprising: a chemical composition containing, in mass %, C: 0.180% or more and less than 0.300%, Mn: 3.50% or more and less than 11.0%, Si: 0.01% to 1.5%, P: 0.05% or less, S: 0.05% or less, Al: 0.005% to 0.1%, and N: 0.01% or less, with a balance consisting of Fe and inevitable impurities; and a microstructure that includes martensite of 70.0% or more in volume fraction and retained austenite of 3.0% or more and 30.0% or less in volume fraction and in which the number of retained austenite grains of 0.3 μm or more in equivalent circular diameter is $2.0 \times 10^5/mm^2$ or more.

13. The hot-press forming part according to 12., wherein the chemical composition further contains, in mass %, one or more groups selected from A group: one or more selected from Ni: 0.01% to 5.0%, Cu: 0.01% to 5.0%, Cr: 0.01% to 5.0%, and Mo: 0.01% to 3.0%, B group: one or more selected from Ti: 0.005% to 3.0%, Nb: 0.005% to 3.0%, V: 0.005% to 3.0%, and W: 0.005% to 3.0%, C group: one or more selected from REM: 0.0005% to 0.01%, Ca: 0.0005% to 0.01%, and Mg: 0.0005% to 0.01%, D group: Sb: 0.002% to 0.03%, and E group: B: 0.0005% to 0.05%.

14. The hot-press forming part according to 12. or 13., comprising a coating layer on a surface thereof.

15. The hot-press forming part according to 14., wherein the coating layer is a zinc-based coating layer or an aluminum-based coating layer.

16. The hot-press forming part according to 15., wherein the zinc-based coating layer contains Ni: 10 mass % to 25 mass %.

17. A method of manufacturing a hot-press forming part, comprising: heating, as a blank sheet, a steel sheet to a temperature range of $Ac_3$ point or more and 1000° C. or less, the steel sheet including: a chemical composition containing, in mass %, C: 0.180% or more and less than 0.300%, Mn: 3.50% or more and less than 11.0%, Si: 0.01% to 1.5%, P: 0.05% or less, S: 0.05% or less, Al: 0.005% to 0.1%, and N: 0.01% or less, with a balance consisting of Fe and inevitable impurities; and a microstructure that includes ferrite and cementite and in which Mnθ/Mnα is 1.4 or more, where Mnα is a Mn concentration of the ferrite and Mnθ is a Mn concentration of the cementite; retaining the steel sheet in the temperature range for 10 sec or more and 900 sec or less; and thereafter performing press forming and hardening simultaneously on the steel sheet using a tool for press forming, to obtain a hot-press forming part including a microstructure that includes martensite of 70.0% or more in volume fraction and retained austenite of 3.0% or more and 30.0% or less in volume fraction and in which the number of retained austenite grains of 0.3 μm or more in equivalent circular diameter is $2.0 \times 10^5/mm^2$ or more.

18. The method of manufacturing a hot-press forming part according to 17., wherein the chemical composition further contains, in mass %, one or more groups selected from A group: one or more selected from Ni: 0.01% to 5.0%, Cu: 0.01% to 5.0%, Cr: 0.01% to 5.0%, and Mo: 0.01% to 3.0%, B group: one or more selected from Ti: 0.005% to 3.0%, Nb: 0.005% to 3.0%, V: 0.005% to 3.0%, and W: 0.005% to 3.0%, C group: one or more selected from REM: 0.0005% to 0.01%, Ca: 0.0005% to 0.01%, and Mg: 0.0005% to 0.01%, D group: Sb: 0.002% to 0.03%, and E group: B: 0.0005% to 0.05%.

19. The method of manufacturing a hot-press forming part according to 17. or 18., wherein the steel sheet has a coating layer on a surface thereof.

20. The method of manufacturing a hot-press forming part according to 19., wherein the coating layer is a zinc-based coating layer or an aluminum-based coating layer.

21. The method of manufacturing a hot-press forming part according to 20., wherein the zinc-based coating layer contains Ni: 10 mass % to 25 mass %.

Advantageous Effect

By using the presently disclosed steel sheet for hot press as a blank sheet, it is possible to manufacture a hot-press forming part that has both high strength of 1800 MPa or more in tensile strength TS and high ductility of 6.0% or more in uniform elongation uEl and also has excellent delayed fracture resistance.

Moreover, by using such a hot-press forming part in an automotive part, fuel efficiency can be improved by weight reduction of automotive body while applying a structure design of automotive body that absorbs crash energy upon crash. The presently disclosed technique thus has significant advantageous effects industrially.

BRIEF DESCRIPTION OF THE DRAWINGS

In the accompanying drawings:
FIG. 1 is a schematic diagram of a test jig used in delayed fracture resistance evaluation.

DETAILED DESCRIPTION

The presently disclosed technique is described in detail below.

The reasons for limiting the chemical composition of a steel sheet for hot press according to one of the disclosed embodiments are given below. While the unit of the content of each element in the chemical composition is "mass %," the unit is hereafter simply expressed by "%" unless otherwise specified.

C: 0.180% or more and less than 0.300%

C is an element that increases the strength of the steel. To achieve the effect and ensure a tensile strength TS of 1800 MPa or more, the C content is 0.180% or more. If the C content is 0.300% or more, the degree of solid solution strengthening by C is excessively high, which makes it difficult to adjust the uniform elongation uEl of the hot-press forming part to 6.0% or more and adjust the tensile strength TS of the hot-press forming part to less than 2300 MPa. The C content is therefore 0.180% or more and less than 0.300%. The C content is preferably 0.200% or more. The C content is preferably 0.285% or less.

Mn: 3.50% or more and less than 11.0%

Mn is an important element that increases the strength of the steel and also improves the stability of retained austenite in the hot-press forming part. To achieve the effect and ensure both a tensile strength TS of 1800 MPa or more and a uniform elongation uEl of 6.0% or more of the hot-press forming part, the Mn content needs to be 3.50% or more. If the Mn content is 11.0% or more, the degree of solid solution strengthening by Mn is excessively high, which makes it difficult to adjust the uniform elongation uEl of the hot-press forming part to 6.0% or more and adjust the tensile strength TS of the hot-press forming part to less than 2300 MPa. The Mn content is therefore 3.50% or more and less than 11.0%. The Mn content is preferably 4.00% or more, more preferably 4.50% or more, and further preferably 5.00% or more. The Mn content is preferably 10.0% or less, more preferably 8.00% or less, and further preferably 7.00% or less.

Si: 0.01% or more and 1.5% or less

Si is an element that increases the strength of the steel by solid solution strengthening. To achieve the effect, the Si content is 0.01% or more. If the Si content is more than 1.5%, the precipitation of cementite in annealing in the manufacture of the steel sheet for hot press is inhibited. Accordingly, in a hot-press forming part yielded using the steel sheet for hot press as a blank sheet, it is difficult to obtain a microstructure in which retained austenite having an appropriate size is dispersed, and desired delayed fracture resistance cannot be achieved. The Si content is therefore 0.01% or more and 1.5% or less. The Si content is preferably 0.02% or more. The Si content is preferably 1.2% or less.

P: 0.05% or less

P is an element that exists in the steel as an inevitable impurity, and segregates to crystal grain boundaries and like, and causes adverse effects such as a decrease in the toughness of the hot-press forming part. The P content is therefore desirably as low as possible, but 0.05% or less P is allowable. Accordingly, the P content is 0.05% or less. The P content is preferably 0.02% or less. Excessive dephosphorization processing leads to higher smelting cost, and so the P content is preferably 0.0005% or more.

S: 0.05% or less

S is contained in the steel inevitably. S exists as a sulfide inclusion, and decreases the ductility, toughness and the like of the hot-press forming part. The S content is therefore desirably as low as possible, but 0.05% or less S is allowable. Accordingly, the S content is 0.05% or less. The S content is preferably 0.005% or less. Excessive desulfurization processing leads to higher smelting cost, and so the S content is preferably 0.0005% or more.

Al: 0.005% to 0.1%

Al is an element that acts as a deoxidizing agent. To achieve the effect, the Al content is 0.005% or more. If the Al content is more than 0.1%, Al combines with nitrogen to form a large amount of nitride. This causes a decrease in the blanking-workability and hardenability of the steel sheet for hot press as a blank sheet. The Al content is therefore 0.005% or more and 0.1% or less. The Al content is preferably 0.02% or more. The Al content is preferably 0.05% or less.

N: 0.01% or less

N is typically contained in the steel inevitably. If the N content is more than 0.01%, nitrides such as MN form during heating in hot rolling or hot press. This causes a decrease in the blanking-workability and hardenability of the steel sheet for hot press as a blank sheet. The N content is therefore 0.01% or less. The N content is preferably 0.0050% or less.

In the case where N is contained inevitably without adjustment, the N content is approximately 0.0025%. Excessive denitridation processing leads to higher smelting cost, and so the N content is preferably 0.0025% or more. The N content is more preferably 0.0030% or more.

In addition to the basic components described above, the chemical composition may contain one or more groups selected from the following A to E groups.

A group: one or more selected from Ni: 0.01% to 5.0%, Cu: 0.01% to 5.0%, Cr: 0.01% to 5.0%, and Mo: 0.01% to 3.0%

Ni, Cu, Cr, and Mo are each an element that increases the strength of the steel and improves hardenability. One or more of them may be selected and added according to need. To achieve the effect, the content of each element is 0.01% or more. To prevent an excessive increase in cost, the Ni, Cu, and Cr contents are each 5.0% or less, and the Mo content is 3.0% or less. Thus, in the case of containing Ni, Cu, Cr, and Mo, their contents are Ni: 0.01% to 5.0%, Cu: 0.01% to 5.0%, Cr: 0.01% to 5.0%, and Mo: 0.01% to 3.0%. The content of each element is preferably 0.01% or more. The content of each element is preferably 1.0% or less.

B group: one or more selected from Ti: 0.005% to 3.0%, Nb: 0.005% to 3.0%, V: 0.005% to 3.0%, and W: 0.005% to 3.0%

Ti, Nb, V, and W are each an element that increases the strength of the steel by precipitation strengthening, and also improves toughness by crystal grain refinement. One or more of them may be selected and added according to need.

Ti has the effect of increasing strength and improving toughness. In addition, Ti forms a nitride more preferentially than B, and thus improves hardenability by solute B. To achieve the effects, the Ti content is 0.005% or more. If the Ti content is more than 3.0%, the rolling load increases extremely in hot rolling, and also the toughness of the hot-press forming part decreases. Accordingly, in the case of containing Ti, the Ti content is 0.005% or more and 3.0% or less. The Ti content is preferably 0.01% or more. The Ti content is preferably 1.0% or less.

To achieve the above-mentioned effect of increasing strength and improving toughness, the Nb content is 0.005% or more. If the Nb content is more than 3.0%, the amount of Nb carbonitride increases, and ductility and delayed fracture resistance decrease. Accordingly, in the case of containing Nb, the Nb content is 0.005% or more and 3.0% or less. The Nb content is preferably 0.01% or more. The Nb content is preferably 0.05% or less.

V has not only the effect of increasing strength and improving toughness, but also the effect of precipitating as a precipitate or a crystallized product and improving hydrogen embrittlement resistance as a hydrogen trap site. To achieve the effects, the V content is 0.005% or more. If the V content is more than 3.0%, the amount of V carbonitride increases considerably, and ductility decreases. Accordingly, in the case of containing V, the V content is 0.005% or more and 3.0% or less. The V content is preferably 0.01% or more. The V content is preferably 2.0% or less.

W has not only the effect of increasing strength and improving toughness, but also the effect of improving hydrogen embrittlement resistance. To achieve the effects, the W content is 0.005% or more. If the W content is more than 3.0%, ductility decreases. Accordingly, in the case of containing W, the W content is 0.005% or more and 3.0% or less. The W content is preferably 0.01% or more. The W content is preferably 2.0% or less.

C group: one or more selected from REM: 0.0005% to 0.01%, Ca: 0.0005% to 0.01%, and Mg: 0.0005% to 0.01%

REM, Ca, and Mg are each an element that improves ductility and hydrogen embrittlement resistance by morphological control of an inclusion. One or more of them may be selected and added according to need. To achieve the effect, the content of each element is 0.0005% or more. To prevent a decrease in hot workability, the REM content and the Ca content are each 0.01% or less. To prevent a decrease in ductility caused by the formation of a coarse oxide or sulfide, the Mg content is 0.01% or less. Thus, in the case of containing REM, Ca, and Mg, their contents are REM: 0.0005% to 0.01%, Ca: 0.0005% to 0.01%, and Mg: 0.0005% to 0.01%. The content of each element is preferably 0.0006% or more. The content of each element is preferably 0.01% or less.

D group: Sb: 0.002% to 0.03%

Sb inhibits the formation of a decarburized layer in the steel sheet surface layer when heating or cooling the steel sheet, and so may be added according to need. To achieve the effect, the Sb content is 0.002% or more. If the Sb content is more than 0.03%, the rolling load increases, and productivity decreases. Accordingly, in the case of containing Sb, the Sb content is 0.002% or more and 0.03% or less. The Sb content is preferably 0.002% or more. The Sb content is preferably 0.02% or less.

E group: B: 0.0005% to 0.05%

B improves hardenability during hot press and toughness after hot press, and so may be added according to need. To achieve the effect, the B content is 0.0005% or more. If the B content is more than 0.05%, the rolling load in hot rolling increases, or martensite or bainite forms after hot rolling. This may cause cracking in the steel sheet. Accordingly, in the case of containing B, the B content is 0.0005% or more and 0.05% or less. The B content is preferably 0.0005% or more. The B content is preferably 0.01% or less.

Components other than those described above are Fe and inevitable impurities. The inevitable impurities include, for example, O (oxygen). 0.0100% or less O is allowable.

The microstructure of the presently disclosed steel sheet for hot press is described below.

The microstructure of the presently disclosed steel sheet for hot press includes ferrite and cementite, and has $Mn\theta/Mn\alpha$ of 1.4 or more where $Mn\alpha$ and $Mn\theta$ are respectively the Mn concentrations of ferrite and cementite.

Ferrite is preferably 92.0% or more and 99.0% or less in volume fraction. If the volume fraction of ferrite is less than 92.0%, the tensile strength exceeds 590 MPa, which causes a decrease in press formability. If the volume fraction of ferrite is more than 99.0%, the tensile strength falls below 340 MPa, which causes a decrease in the strength of the press forming part. The volume fraction of ferrite is more preferably 95.0% or more, and further preferably 96.0% or more. The volume fraction of ferrite is more preferably 99.0% or less, and further preferably 98.4% or less. Cementite is preferably 1.0% or more and 5.0% or less in volume fraction. If the volume fraction of cementite is less than 1.0%, the elongation exceeds 45%, and the sheet thickness of the part subjected to press stress becomes extremely thin. This increases variations in sheet thickness after press forming. If the volume fraction of cementite is more than 5.0%, the elongation falls below 25%, which causes a decrease in press formability. The volume fraction of cementite is more preferably 1.6% or more. The volume fraction of cementite is more preferably 4.4% or less.

Although the microstructure of the presently disclosed steel sheet for hot press is basically composed of ferrite and cementite mentioned above, bainite and/or pearlite may be contained in a minute amount as residual microstructure other than ferrite and cementite. An allowable total volume fraction of such residual microstructure is 5.0% or less.

The identification of the microstructure of the steel sheet for hot press and the measurement of the volume fraction are performed in the following manner.

A microstructure observation test piece is collected from the steel sheet for hot press so that the observation plane is parallel to the rolling direction and is perpendicular to the rolling plane. The observation plane is polished, and etched with a 3 vol. % nital solution to expose the microstructure. The microstructure at a position of ¼ of the sheet thickness is observed using a scanning electron microscope (at 1500 magnifications) and photographed. From the obtained micrograph, the microstructure is identified by image analysis. A phase observed as black with a relatively smooth surface is identified as ferrite. A phase observed as white in film or lump form is identified as cementite. A phase in which ferrite and cementite form in layers is identified as pearlite. A phase in which a carbide forms between laths and a phase made of bainitic ferrite having no carbide in grains are identified as bainite. The occupancy area ratio of each phase in the micrograph is calculated, and the occupancy area ratio of each phase is taken to be the volume fraction on the assumption that the phase is homogeneous three-dimensionally.

The "volume fraction of residual microstructure" is calculated by subtracting the above-mentioned "volume fraction of ferrite" and "volume fraction of cementite" from 100%.

Ratio $Mn\theta/Mn\alpha$ of Mn concentration of cementite to Mn concentration of ferrite: 1.4 or more Cementite included in the microstructure of the steel sheet for hot press functions as a retained austenite formation site in the hot-press forming part. To ensure a predetermined amount of retained austenite and obtain a microstructure in which retained austenite having at least a predetermined size is dispersed in the hot-press forming part, it is important to increase the degree of concentration of Mn in cementite relative to ferrite which is the matrix phase. Let $Mn\alpha$ and $Mn\theta$ be the Mn concentrations of ferrite and cementite, respectively. In the case where $Mn\theta/Mn\alpha$ is less than 1.4, the concentration of Mn in cementite is low. This makes it impossible to obtain a desired volume fraction of retained austenite or obtain a microstructure in which retained austenite having at least a predetermined size is appropriately dispersed in the hot-press forming part.

Therefore, $Mn\theta/Mn\alpha$ is 1.4 or more. $Mn\theta/Mn\alpha$ is preferably 1.5 or more, and more preferably 1.8 or more. No upper limit is placed on $Mn\theta/Mn\alpha$, but the upper limit is substantially about 10.0.

The ratio $Mn\theta/Mn\alpha$ of the Mn concentration of cementite to the Mn concentration of ferrite is calculated in the following manner.

A microstructure observation test piece is collected from the steel sheet for hot press so that the observation plane is parallel to the rolling direction and perpendicular to the rolling plane. The observation plane is then polished, and etched with a 3 vol. % nital solution to expose the microstructure. The microstructure at a position of ¼ of the sheet thickness is observed using an electron probe microanalyzer (EPMA), and quantitative analysis of Mn is performed on 30 grains for each of ferrite and cementite. From the Mn quantitative analysis results, the mean value of the Mn concentrations of the crystal grains is calculated for each of ferrite and cementite, and the mean values are taken to be $Mn\alpha$ and $Mn\theta$. The value obtained by dividing $Mn\theta$ by $Mn\alpha$ is taken to be $Mn\theta/Mn\alpha$.

A presently disclosed method of manufacturing a steel sheet for hot press is described below.

The presently disclosed method of manufacturing a steel sheet for hot press includes: heating a slab having the chemical composition described above, and hot rolling the slab to obtain a hot-rolled steel sheet; cold rolling the hot-rolled steel sheet to obtain a cold-rolled steel sheet; and performing annealing that involves heating the cold-rolled steel sheet to a temperature range of $Ac_1$–150° C. or more and less than $Ac_1$ point, thereafter retaining the cold-rolled steel sheet in the temperature range for 1 hr or more, and thereafter cooling the cold-rolled steel sheet.

Obtainment of Hot-Rolled Steel Sheet

The obtainment of the hot-rolled steel sheet is not limited, and may be performed according to a usual method.

For example, it is preferable to subject molten steel having the above-described chemical composition to melt forming in a converter or the like, and process the molten steel into a slab by a continuous casting process in order to prevent macrosegregation. An ingot-making process or a thin slab continuous casting process may be used instead of the continuous casting process.

The slab is cooled to the ambient temperature, and then charged into a heating furnace for reheating. Alternatively, an energy saving process such as a process of charging the slab into the heating furnace as a warm slab without cooling the slab to the ambient temperature or a process of heat-retaining the slab for a short time and then immediately hot rolling the slab may be used.

The resultant slab is heated to a predetermined heating temperature, and then hot rolled to obtain a hot-rolled steel sheet. The heating temperature is preferably 1000° C. to 1300° C. The heated slab is typically hot rolled at a finish rolling entry temperature of 1100° C. or less and a finish rolling delivery temperature of 800° C. to 950° C., cooled at an average cooling rate of 5° C./sec or more, and coiled at a coiling temperature of 300° C. to 750° C., to obtain a hot-rolled steel sheet.

Conditions of finish rolling other than those described above are not limited, but the cumulative reduction ratio in a temperature range of 950° C. or more is preferably 40% or more. If the cumulative reduction ratio in a temperature range of 950° C. or more is high, the recrystallization of austenite progresses, and the crystal grains are refined. Such refinement of austenite reduces the prior austenite grain size of the resultant hot-press forming part, and improves the delayed fracture resistance. The cumulative reduction ratio in a temperature range of 950° C. or more is more preferably 60% or more.

Obtainment of Cold-Rolled Steel Sheet

After this, the hot-rolled steel sheet is cold rolled to obtain a cold-rolled steel sheet. To prevent abnormal grain growth in the subsequent annealing or the heating immediately before the hot press, the reduction ratio in the cold rolling is preferably 30% or more, and more preferably 50% or more. To prevent an increase in rolling load and a decrease in productivity, the reduction ratio is preferably 85% or less.

Before the cold rolling, the hot-rolled steel sheet may be subjected to oxidized scale exfoliation by pickling or the like. In the case where the rolling load in the cold rolling is high, the hot-rolled steel sheet may be subjected to soft annealing.

Annealing

The resultant cold-rolled steel sheet is heated to a temperature range of $Ac_1-150°$ C. or more and less than $Ac_1$ point, thereafter retained in the temperature range for 1 hr or more, and thereafter cooled. The reasons for limiting the annealing temperature and the like in the annealing are given below.

Heating temperature: $Ac_1-150°$ C. or more and less than $Ac_1$ point

It is important to concentrate Mn in cementite in the annealing, as mentioned earlier. If the heating temperature is less than $Ac_1-150°$ C., the diffusion rate of Mn is insufficient, so that the concentration of Mn in cementite is insufficient. This makes it impossible to obtain a desired volume fraction of retained austenite or obtain a microstructure in which retained austenite having at least a predetermined size is appropriately dispersed, in the hot-press forming part. If the heating temperature is $Ac_1$ point or more, ferrite-austenite dual phase forms, so that the concentration of Mn in cementite is insufficient. This also makes it impossible to obtain a microstructure in which retained austenite having at least a predetermined size is appropriately dispersed, in the hot-press forming part.

The heating temperature is therefore $Ac_1-150°$ C. or more and less than $Ac_1$ point. The heating temperature is preferably $Ac_1-130°$ C. or more. The heating temperature is preferably $Ac_1-10°$ C. or less.

Retention time: 1 hr or more

If the retention time is less than 1 hr, the concentration of Mn in cementite is insufficient, and predetermined Mnθ/Mnα cannot be obtained. Besides, the size of cementite serving as a retained austenite formation site in hot-press forming part is small. Accordingly, in the hot-press forming part, the volume fraction of retained austenite decreases, and a microstructure in which retained austenite having at least a predetermined size is appropriately dispersed cannot be obtained. As a result, desired delayed fracture resistance and uniform elongation cannot be achieved.

The retention time (annealing time) is therefore 1 hr or more. No upper limit is placed on the retention time, but the retention time is preferably 48 hr or less in terms of productivity. The retention time is more preferably 1.5 hr or more. The retention time is more preferably 24 hr or less.

The cooling after the retention is not limited. Radiational cooling (slow cooling) or controlled cooling may be performed as appropriate depending on the heating furnace used and the like.

The annealing is preferably performed in a batch-annealing furnace. In the case of performing the annealing in a batch-annealing furnace, conditions other than those described above are not limited. However, it is preferable to, for example, set the average heating rate to 10° C./hr or more and 150° C./hr or less and the average cooling rate after the retention to 10° C./hr or more and 150° C./hr or less, in terms of the concentration of Mn in cementite.

The heating rate is more preferably 20° C./hr or more. The heating rate is more preferably 100° C./hr or less.

The cooling rate is more preferably 20° C./hr or more. The cooling rate is more preferably 100° C./hr or less.

The above-mentioned $Ac_1$ point (° C.) and the below-mentioned $Ac_3$ point (° C.) are calculated using the following formulae:

$$Ac_1 \text{ point } (° C.) = 751 - 16C + 11Si - 28Mn - 5.5Cu - 16Ni + 13Cr + 3.4Mo$$

$$Ac_3 \text{ point } (° C.) = 910 - 203C^{1/2} + 44.7Si - 4Mn + 11Cr$$

where C, Si, Mn, Cu, Ni, Cr, and Mo are each the content (mass %) of the corresponding element. In the case where the element is not contained, the content of the element is assumed to be 0.

Coating

A coating layer may be formed on the surface of the steel sheet for hot press obtained as described above. In the case where a steel sheet for hot press with no coating layer formed on its surface is used as a blank sheet, oxidized scale exfoliation treatment such as shot blasting needs to be performed on the hot-press forming part after the hot press. In the case where a coating layer is formed on the surface of the steel sheet for hot press, on the other hand, oxidized scale formation is suppressed during heating in the hot press, so that oxidized scale exfoliation treatment after the hot press is unnecessary. This improves productivity.

The coating layer is preferably a zinc-based coating layer (in other words, a zinc or zinc alloy coating layer) or an aluminum-based coating layer (in other words, an aluminum or aluminum alloy coating layer). In the case where corrosion resistance is required, a zinc-based coating layer is better than an aluminum-based coating layer, because the corrosion rate of the base metal can be reduced by the sacrificial protection effect of zinc. There is also an advantage that, in the case of hot pressing the coated steel sheet, a zinc oxide film forms in the initial stage of heating in the hot press, so that evaporation of Zn can be prevented in the subsequent treatment of the hot-press forming part.

Examples of the zinc-based coating layer include typical hot-dip galvanizing (GI), galvannealing (GA), and Zn—Ni coating (in other words, Zn—Ni alloy coating). Zn—Ni coating is particularly preferable. A Zn—Ni coating layer can remarkably suppress oxidized scale formation during hot-press heating, and also prevent cracks by liquid metal embrittlement. To achieve the effects, the Zn—Ni coating layer preferably contains 10 mass % to 25 mass % Ni. If more than 25 mass % Ni is contained, the effects are saturated.

Examples of the aluminum-based coating layer include Al—10 mass % Si coating.

The coating weight of the coating layer is preferably 10 g/m$^2$ to 90 g/m$^2$ per side. If the coating weight is 10 g/m$^2$ or more, the effect of suppressing oxidized scale formation during heating is sufficient. If the coating weight is 90 g/m$^2$ or less, productivity is not hampered. The coating weight of the coating layer is more preferably 30 g/m$^2$ or more per side. The coating weight of the coating layer is more preferably 70 g/m$^2$ or less per side.

Pickling and/or temper rolling may be performed as appropriate between the processes described above.

A presently disclosed hot-press forming part is described below.

The presently disclosed hot-press forming part has the chemical composition of the steel sheet for hot press described above, and has a microstructure that includes martensite of 70.0% or more in volume fraction and retained austenite of 3.0% or more and 30.0% or less in volume fraction and in which the number of retained austenite grains of 0.3 μm or more in equivalent circular diameter is $2.0 \times 10^5$/mm$^2$ or more.

For example, the presently disclosed hot-press forming part can be obtained by subjecting the above-described steel sheet for hot press as a blank sheet to hot press under predetermined conditions.

The microstructure of the presently disclosed hot-press forming part is described below.

Volume fraction of martensite: 70.0% or more

To ensure a tensile strength TS of 1800 MPa or more in the hot-press forming part, martensite needs to be the main phase, that is, martensite needs to be 70.0% or more in volume fraction. The volume fraction of martensite is preferably 80.0% or more. The volume fraction of martensite is 97.0% or less, in order to contain a desired amount of retained austenite.

Volume fraction of retained austenite: 3.0% to 30.0%

Retained austenite is an important microstructure that enhances uniform elongation by a transformation-induced plasticity (TRIP) effect upon deformation. The volume fraction of retained austenite needs to be 3.0% or more, to achieve a uniform elongation uEl of 6.0% or more. If the volume fraction of retained austenite is more than 30.0%, hard martensite transformed after the TRIP effect is developed increases excessively, and toughness decreases. The volume fraction of retained austenite is therefore 3.0% or more and 30.0% or less. The volume fraction of retained austenite is preferably 5.0% or more. The volume fraction of retained austenite is preferably 20.0% or less.

Although the microstructure of the presently disclosed hot-press forming part is basically composed of martensite and retained austenite mentioned above, bainite, ferrite, cementite, and/or pearlite may be contained in a minute amount as residual microstructure other than martensite and retained austenite. An allowable total volume fraction of such residual microstructure is 10% or less (including 0%).

The volume fraction of the microstructure of the hot-press forming part is measured in the following manner.

First, an X-ray diffraction test piece is cut out of a top portion of a hat-shaped part of the hot-press forming part, mechanically polished and chemically polished so that the measurement plane is at a position of ¼ of the thickness, and then subjected to X-ray diffraction. Using CoKα radiation as an incident X-ray, the peak integrated intensity for the retained austenite (γ) planes of {200}, {220}, and {311} and the peak integrated intensity for the ferrite (α) planes of {200} and {211} are measured. For a total of six patterns of α{200}-γ{200}, α{200}-γ{220}, α{200}-γ{311}, α{211}-γ{200}, α{211}-γ{220}, and α{211}-γ{311}, the retained γ volume fraction obtained from each integrated intensity ratio is calculated. Their mean value is taken to be the "volume fraction of retained austenite".

Next, a microstructure observation test piece is collected from the top portion of the hat-shaped part of the hot-press forming part so that the observation plane is parallel to the rolling direction and perpendicular to the surface of the top portion of the hat-shaped part. The observation plane is polished, and etched with a 3 vol. % nital solution to expose the microstructure. The microstructure at a position of ¼ of the sheet thickness is observed using a scanning electron microscope (at 1500 magnifications) and photographed. From the obtained micrograph, the microstructure is identified by image analysis. A phase observed as black with a relatively smooth surface is identified as ferrite. A phase observed as white in film or lump form in crystal grain boundaries is identified as cementite. A phase in which ferrite and cementite form in layers is identified as pearlite. A phase in which a carbide forms between laths and a phase made of bainitic ferrite having no carbide in grains are identified as bainite. The occupancy area ratio of each phase in the micrograph is calculated, and the occupancy area ratio of each phase is taken to be the volume fraction on the assumption that the phase is homogeneous three-dimensionally. The total of these volume fractions is taken to be the "volume fraction of residual microstructure other than martensite and retained austenite".

The "volume fraction of martensite" is calculated by subtracting the above-mentioned "volume fraction of retained austenite" and "volume fraction of residual microstructure other than martensite and retained austenite" from 100%.

Number of retained austenite grains of 0.3 μm or more in equivalent circular diameter: $2.0 \times 10^5$/mm$^2$ or more Retained austenite is a microstructure that functions as a hydrogen occlusion site and enhances delayed fracture resistance. In particular, to achieve excellent delayed fracture resistance while ensuring high strength of a tensile strength TS of 1800 MPa or more, it is essential that the microstructure of the hot-press forming part is a microstructure in which at least $2.0 \times 10^5$/mm$^2$ comparatively large-sized retained austenite grains of 0.3 μm or more in equivalent circular diameter are dispersed. If the number of retained austenite grains of 0.3 μm or more in equivalent circular diameter is less than $2.0 \times 10^5$/mm$^2$, hydrogen that has entered the steel sheet cannot be occluded uniformly, and so desired delayed fracture resistance cannot be achieved. Accordingly, the number of retained austenite grains of 0.3 μm or more in equivalent circular diameter is $2.0 \times 10^5/mm^2$ or more. The number of retained austenite grains of 0.3 μm or more reaches an upper limit when the volume fraction of retained austenite is 30%. In the case where the equivalent circular diameter of retained austenite is 0.3 μm, the upper limit is $4.3 \times 10^6/mm^2$.

To obtain a microstructure that has the above-mentioned appropriate amount of retained austenite and in which retained austenite having at least the predetermined size is appropriately dispersed, it is important to use, as a blank steel sheet, a steel sheet that has a chemical composition with appropriately controlled Mn content and has a microstructure in which Mn is concentrated in cementite, and heat the steel sheet under predetermined conditions to perform hot press, as mentioned earlier.

The number of retained austenite grains of 0.3 μm or more in equivalent circular diameter per unit area is calculated in the following manner.

A microstructure observation test piece is collected in the same way as above. The observation plane is electropolished, and the part at a position of ¼ of the sheet thickness is photographed using a scanning electron microscope (at 1500 magnifications) with EBSP (Electron Back-Scattering Pattern). EBSP data is then subjected to image processing, thus extracting only crystal grains identified as retained austenite. The equivalent circular diameter is calculated from the area of each crystal grain. The number of retained austenite grains of 0.3 μm or more in equivalent circular diameter is counted, and the number of grains per 1 mm×1 mm is calculated.

Although not particularly limited, in the microstructure of the hot-press forming part, the prior austenite grain size is preferably 100 μm or less. When the crystal grain size is finer, the grain boundary area is greater. Hence, hydrogen coverage per unit grain boundary area decreases, so that delayed fracture resistance is improved. The prior austenite grain size is more preferably in a range of 3 μm to 20 μm.

The prior austenite grain size is measured in the following manner.

A microstructure observation test piece is collected in the same way as above. The observation plane in the collected microstructure observation test piece is polished, and etched with picric acid and a surfactant to expose the microstructure. The microstructure at a position of ¼ of the sheet thickness is observed using an optical microscope (at 500 magnifications) and photographed. Using the obtained micrograph, the equivalent circular diameter is calculated from the prior austenite grain occupancy area for each prior austenite grain, and the mean value of the equivalent circular diameters is taken to be the prior austenite grain size.

The presently disclosed hot-press forming part including the above-described chemical composition and microstructure has both high strength of a tensile strength TS of 1800 MPa or more (preferably less than 2300 MPa) and high ductility of a uniform elongation uEl of 6.0% or more (20% or less) and also has excellent delayed fracture resistance.

Suitable press conditions in the manufacture of the presently disclosed hot-press forming part are described below.

Hot-Press Heating

The above-described steel sheet for hot press is heated to a temperature range of $Ac_3$ point or more and 1000° C. or less and retained in the temperature range for 10 sec or more and 900 sec or less.

Heating temperature: $Ac_3$ point or more and 1000° C. or less

If the heating temperature is less than $Ac_3$ point which is in an austenite single phase region, austenitization is insufficient. As a result, the desired amount of martensite in the hot-press forming part cannot be ensured, and the desired tensile strength cannot be achieved.

In the heating, cementite reversely transforms to austenite. Austenite reversely transformed from cementite has high Mn concentration, as compared with austenite reversely transformed from ferrite. Mn is an element that stabilizes austenite. Hence, austenite reversely transformed from Mn-concentrated cementite has high Mn concentration, and functions as a retained austenite formation site in the hot-press forming part.

If the heating temperature is more than 1000° C., Mn concentrated in cementite is made uniform. Consequently, the desired amount of retained austenite cannot be ensured, and the desired uniform elongation cannot be achieved. Besides, a microstructure in which retained austenite having at least the predetermined size is appropriately dispersed cannot be obtained, and the desired delayed fracture resistance cannot be achieved.

The heating temperature is therefore preferably $Ac_3$ point or more and 1000° C. or less. The heating temperature is more preferably ($Ac_3$ point+30) ° C. or more. The heating temperature is more preferably 950° C. or less.

The average heating rate to the heating temperature is not limited, but is preferably 1° C./sec to 400° C./sec. If the average heating rate is 1° C./sec or more, productivity is not hampered. If the average heating rate is 400° C./sec or less, unstable temperature control is prevented. The average heating rate is more preferably 10° C./sec or more. The average heating rate is more preferably 150° C./sec or less.

Retention time: 10 sec or more and 900 sec or less

With the passage of the retention time, concentrated Mn diffuses around and is made uniform. Accordingly, if the retention time is more than 900 sec, the desired amount of retained austenite cannot be ensured, and the desired uniform elongation cannot be achieved. Besides, a microstructure in which retained austenite having at least the predetermined size is appropriately dispersed cannot be obtained, and the desired delayed fracture resistance cannot be achieved. If the retention time is 10 sec or less, the reverse transformation from cementite to austenite is insufficient. Consequently, a microstructure in which retained austenite having at least the predetermined size is appropriately dispersed cannot be obtained, and the desired delayed fracture resistance cannot be achieved. The retention time is therefore preferably 10 sec or more and 900 sec or less.

The heating method is not limited, and may be any typical heating method such as an electric furnace, a gas furnace, infrared heating, high-frequency heating, or direct electric heating. The atmosphere is not limited, and may be any of an air atmosphere and an inert gas atmosphere.

Hot-Press Forming

In the hot-press forming, the steel sheet for hot press which has undergone the hot-press heating is simultaneously press formed and hardened using a tool for press forming, to obtain a hot-press forming part of a predetermined shape. Here, "hot-press forming" is a process of press forming a heated steel sheet using a tool for press forming and simultaneously rapid-cooling it, and is also referred to as "hot forming", "hot stamping", "die quenching", etc.

The press forming start temperature in the press machine is not limited, but is preferably Ms point or more. If the press forming start temperature is less than Ms point, the load of press forming increases, and the load on the press machine increases. The conveyance of the blank steel sheet before the press forming start is typically performed with air cooling. Accordingly, the upper limit of the press forming start temperature is the heating temperature in the above-mentioned heating. In the case where the blank steel sheet is conveyed in an environment where the cooling rate is accelerated by gas, liquid, or the like, the cooling rate is preferably decreased by a heat insulation jig such as a heat retaining box.

The cooling rate in the tool for press forming is not limited. In terms of productivity, the average cooling rate to 200° C. is preferably 20° C./sec or more, and more preferably 40° C./sec or more.

The removal time from the tool for press forming and the cooling rate after the removal are not limited. As the cooling method, for example, a punch is held at the bottom dead center for 1 sec to 60 sec, and the press forming part is cooled using a die and the punch. After this, the press forming part is removed from the tool for press forming, and cooled. The cooling in the tool for press forming and the cooling after the removal from the tool for press forming may be performed in combination with a cooling method using a refrigerant such as gas or liquid. This improves productivity.

EXAMPLES

Molten steel having the chemical composition (the balance consisting of Fe and inevitable impurities) listed in Tables 1 and 4 was subjected to melt forming in a small vacuum melting furnace, to yield a slab. The slab was heated to 1250° C., and further subjected to hot rolling including rough rolling and finish rolling, to obtain a hot-rolled steel sheet. The hot rolling conditions were finish rolling entry temperature: 1100° C. and finish rolling delivery temperature: 850° C., and the cumulative reduction ratio in a temperature range of 950° C. or more was the value listed in Tables 2 and 5. After the hot rolling, the hot-rolled steel sheet was cooled at an average cooling rate in a temperature range of 800° C. to 650° C. of 15° C./sec, and coiled at a coiling temperature of 650° C.

The obtained hot-rolled steel sheet was pickled, and cold rolled at a reduction ratio of 54%, to obtain a cold-rolled steel sheet (sheet thickness: 1.6 mm). The cold-rolled steel sheet was then heated to the heating temperature T1 listed in Tables 2 and 5 at an average heating rate of 40° C./hr, retained for the time listed in Tables 2 and 5, and subsequently cooled at an average cooling rate of 40° C./hr, to obtain a steel sheet for hot press.

The obtained steel sheet for hot press was subjected to microstructure identification, volume fraction measurement, and Mnθ/Mnα derivation by the above-mentioned methods. The results are listed in Tables 2 and 5.

As listed in Tables 2 and 5, some steel sheets for hot press were subjected to coating treatment. In Tables 2 and 5, "Zn—Ni coating" denotes a Zn—12 mass % Ni coating layer, and "Al—Si coating" denotes a Al—10 mass % Si coating layer. The coating weight of each coating layer was 60 g/m² per side.

Subsequently, the steel sheet for hot press was heated under the conditions listed in Tables 3 and 6 and then subjected to hot press, to obtain a hot-press forming part hat-shaped in cross section. The hot press was performed using a punch having a width of 70 mm and a shoulder radius R of 6 mm and a die having a shoulder radius R of 6 mm, with a press-forming depth of 30 mm.

In the case of performing the heating using an electric heating furnace in the air, the average heating rate from the ambient temperature to 750° C. was 7.5° C./sec, and the average heating rate from 750° C. to the heating temperature was 2.0° C./sec. In the case of performing the heating using a direct electric heater in the air, the average heating rate from the ambient temperature to the heating temperature was 100° C./sec. After reaching the heating temperature, the steel sheet was retained at the heating temperature.

The press forming start temperature in the hot press was 750° C. The cooling in the tool for press forming was performed as follows. The steel sheet was cooled to 150° C. or less by a combination of: clamping the steel sheet using the die and the punch such that the punch is held at the bottom dead center for 15 sec; and air cooling on the die after release from the clamping. The average cooling rate from the press forming start temperature to 200° C. was 100° C./sec.

A JIS No. 5 tensile test piece (parallel portion width: 25 mm, parallel portion length: 60 mm, GL=50 mm) was collected from a top portion of a hat-shaped part of the obtained hot-press forming part, and a tensile test was conducted according to JIS Z 2241 to determine the yield stress YS, the tensile strength TS, the uniform elongation uEl, and the total elongation tEl. The results are listed in Tables 3 and 6.

The hot-press forming part was also subjected to microstructure identification, volume fraction measurement, prior austenite grain size measurement, and measurement of the number of retained austenite grains of 0.3 μm or more in equivalent circular diameter. The results are listed in Tables 3 and 6.

Further, a rectangular test piece for delayed fracture resistance evaluation (width 20 mm, length 115 mm) was collected from the top portion of the hat-shaped part of the hot-press forming part. The collected rectangular test piece was immersed in a test solution (hydrochloric acid, pH: 1) in a state of applying stress thereto using a 4-point bending test jig illustrated in FIG. 1, to evaluate the delayed fracture resistance. Each test piece that developed no fracture even when immersed in the test solution for 200 hr or more was rated as excellent. Each test piece that developed a fracture when immersed in the test solution for 100 hr or more and less than 200 hr was rated as good. Each test piece that developed a fracture when immersed in the test solution for less than 100 hr was rated as poor.

The results are listed in Tables 3 and 6.

As the stress σ (kg/mm²) applied to the rectangular test piece, stress which is 90% of YS obtained in the tensile test was applied, and the applied stress was adjusted by the screw fastening amount y (mm). The stress σ applied to the rectangular test piece can be calculated from the screw fastening amount y (mm) according to the following formula:

$$y = \frac{\sigma}{Et}\left(\frac{2}{3}L_1^2 + L_1 L_2 + \frac{1}{4}L_2^2\right) \tag{1}$$

where y is the fastening amount (mm), σ is the applied stress (kg/mm²), E is the Young's modulus, t is the sheet thickness (mm), L1=30 mm, and L2=40 mm. The Young's modulus was set as $2.1 \times 10^4$ (kg/mm²).

TABLE 1

| | Chemical composition | | | | | | | | | |
|---|---|---|---|---|---|---|---|---|---|---|
| Steel ID | C (mass %) | Mn (mass %) | Si (mass %) | P (mass %) | S (mass %) | Al (mass %) | N (mass %) | $Ac_1$ point (° C.) | $Ac_3$ point (° C.) | Remarks |
| A | 0.225 | 5.29 | 0.16 | 0.0022 | 0.0020 | 0.038 | 0.0045 | 601 | 800 | Conforming steel |
| B | 0.290 | 5.66 | 0.33 | 0.0011 | 0.0015 | 0.039 | 0.0026 | 591 | 793 | Conforming steel |
| C | 0.325 | 5.35 | 0.15 | 0.0024 | 0.0012 | 0.038 | 0.0025 | 598 | 780 | Comparative steel |
| D | 0.195 | 5.64 | 0.17 | 0.0014 | 0.0015 | 0.030 | 0.0041 | 592 | 805 | Conforming steel |
| E | 0.175 | 5.54 | 0.31 | 0.0017 | 0.0025 | 0.033 | 0.0027 | 597 | 817 | Comparative steel |
| F | 0.223 | 8.20 | 0.19 | 0.0014 | 0.0028 | 0.040 | 0.0023 | 520 | 790 | Conforming steel |
| G | 0.214 | 10.15 | 0.21 | 0.0019 | 0.0032 | 0.032 | 0.0030 | 466 | 785 | Conforming steel |
| H | 0.204 | 12.40 | 0.33 | 0.0021 | 0.0024 | 0.027 | 0.0027 | 404 | 783 | Comparative steel |
| I | 0.230 | 5.20 | 0.35 | 0.0022 | 0.0029 | 0.035 | 0.0026 | 606 | 807 | Conforming steel |
| J | 0.229 | 4.15 | 0.17 | 0.0020 | 0.0023 | 0.027 | 0.0026 | 633 | 804 | Conforming steel |
| K | 0.239 | 2.90 | 0.17 | 0.0021 | 0.0022 | 0.037 | 0.0028 | 668 | 807 | Comparative steel |
| L | 0.220 | 5.17 | 2.10 | 0.0024 | 0.0025 | 0.035 | 0.0031 | 626 | 888 | Comparative steel |
| M | 0.244 | 5.58 | 0.07 | 0.0024 | 0.0014 | 0.025 | 0.0036 | 592 | 790 | Conforming steel |
| N | 0.251 | 4.91 | 0.35 | 0.0011 | 0.0012 | 0.036 | 0.0023 | 613 | 804 | Conforming steel |
| O | 0.248 | 5.64 | 0.20 | 0.0019 | 0.0025 | 0.043 | 0.0043 | 591 | 795 | Conforming steel |
| P | 0.236 | 7.83 | 0.06 | 0.0013 | 0.0013 | 0.043 | 0.0029 | 529 | 783 | Conforming steel |
| Q | 0.265 | 6.58 | 0.28 | 0.0020 | 0.0018 | 0.041 | 0.0045 | 566 | 792 | Conforming steel |
| R | 0.244 | 6.74 | 0.02 | 0.0013 | 0.0021 | 0.032 | 0.0041 | 559 | 784 | Conforming steel |
| RA | 0.247 | 4.98 | 0.26 | 0.0021 | 0.0015 | 0.029 | 0.0046 | 610 | 801 | Conforming steel |
| RB | 0.254 | 4.89 | 0.20 | 0.0023 | 0.0022 | 0.041 | 0.0031 | 612 | 797 | Conforming steel |
| RC | 0.237 | 4.37 | 0.10 | 0.0013 | 0.0019 | 0.036 | 0.0028 | 626 | 798 | Conforming steel |
| RD | 0.241 | 4.15 | 0.35 | 0.0024 | 0.0012 | 0.037 | 0.0048 | 635 | 809 | Conforming steel |
| RE | 0.266 | 5.39 | 0.08 | 0.0019 | 0.0018 | 0.026 | 0.0037 | 597 | 787 | Conforming steel |
| RF | 0.244 | 5.83 | 0.22 | 0.0012 | 0.0024 | 0.028 | 0.0023 | 586 | 796 | Conforming steel |

TABLE 2

| | | Hot rolling condition Cumulative reduction ratio in temperature range of 950° C. or more in finish rolling (%) | Annealing condition | | | Microstructure of steel sheet for hot press | |
|---|---|---|---|---|---|---|---|
| Steel sheet ID | Steel ID | | $Ac_1$ point −150 (° C.) | Heating temperature T1 (° C.) | Retention time (hr) | Ferrite phase volume fraction (%) | Cementite volume fraction (%) |
| A1 | A | 42 | 451 | 567 | 2.0 | 99.0 | 1.0 |
| A2 | A | 37 | 451 | 651 | 2.0 | 98.3 | 1.7 |
| A3 | A | 38 | 451 | 435 | 2.0 | 98.1 | 1.9 |
| A4 | A | 53 | 451 | 567 | 2.0 | 95.3 | 4.7 |
| A5 | A | 46 | 451 | 567 | 2.0 | 97.8 | 2.2 |
| B1 | B | 58 | 441 | 447 | 2.6 | 96.0 | 4.0 |
| B2 | B | 49 | 441 | 447 | 2.6 | 97.7 | 2.3 |
| B3 | B | 51 | 441 | 447 | 2.6 | 96.7 | 3.3 |
| B4 | B | 43 | 441 | 447 | 0.4 | 95.4 | 4.6 |
| C1 | C | 56 | 448 | 483 | 2.7 | 98.5 | 1.5 |
| D1 | D | 58 | 442 | 589 | 1.7 | 95.3 | 4.7 |
| E1 | E | 39 | 447 | 567 | 2.2 | 95.9 | 4.1 |
| F1 | F | 49 | 370 | 475 | 1.7 | 96.5 | 3.5 |
| G1 | G | 53 | 316 | 402 | 2.7 | 92.7 | 2.5 |
| H1 | H | 60 | 254 | 337 | 1.6 | 93.6 | 2.4 |
| I1 | I | 37 | 456 | 564 | 2.3 | 97.6 | 2.4 |
| J1 | J | 46 | 483 | 489 | 2.2 | 95.6 | 4.4 |
| K1 | K | 52 | 518 | 663 | 2.9 | 99.6 | 0.4 |
| L1 | L | 36 | 476 | 495 | 3.0 | 93.1 | 2.1 |
| M1 | M | 44 | 442 | 591 | 2.0 | 96.4 | 3.6 |
| N1 | N | 52 | 463 | 592 | 2.8 | 95.2 | 4.8 |
| O1 | O | 35 | 441 | 479 | 1.8 | 98.5 | 1.5 |
| P1 | P | 49 | 379 | 499 | 1.9 | 98.8 | 1.2 |
| Q1 | Q | 36 | 416 | 487 | 2.2 | 96.3 | 3.7 |
| R1 | R | 38 | 409 | 444 | 2.2 | 95.1 | 4.9 |
| RA1 | RA | 81 | 460 | 530 | 3.0 | 95.9 | 4.1 |
| RB1 | RB | 72 | 462 | 530 | 1.5 | 96.9 | 3.1 |
| RC1 | RC | 73 | 476 | 530 | 2.5 | 97.1 | 2.9 |
| RD1 | RD | 75 | 485 | 539 | 1.8 | 96.1 | 3.9 |
| RE1 | RE | 73 | 447 | 540 | 1.7 | 96.7 | 3.3 |
| RF1 | RF | 76 | 436 | 555 | 2.9 | 95.9 | 4.1 |

TABLE 2-continued

| | | Microstructure of steel sheet for hot press | | | |
|---|---|---|---|---|---|
| | Steel sheet ID | Residual microstructure* volume fraction (%) | Mnθ/ Mnα | Steel sheet surface treatment | Remarks |
| | A1 | — | 2.4 | Zn—Ni coating | Example |
| | A2 | — | 1.2 | Zn—Ni coating | Comparative Example |
| | A3 | — | 1.0 | Zn—Ni coating | Comparative Example |
| | A4 | — | 2.4 | Zn—Ni coating | Comparative Example |
| | A5 | — | 2.4 | Zn—Ni coating | Comparative Example |
| | B1 | — | 2.4 | Zn—Ni coating | Example |
| | B2 | — | 2.4 | Zn—Ni coating | Comparative Example |
| | B3 | — | 2.4 | Zn—Ni coating | Comparative Example |
| | B4 | — | 0.9 | Zn—Ni coating | Comparative Example |
| | C1 | — | 2.3 | Zn—Ni coating | Comparative Example |
| | D1 | — | 2.0 | Al—Si coating | Example |
| | E1 | — | 1.6 | Zn—Ni coating | Comparative Example |
| | F1 | — | 2.6 | Bare | Example |
| | G1 | B: 4.8 | 1.8 | Zn—Ni coating | Example |
| | H1 | M: 4.0 | 1.6 | Zn—Ni coating | Comparative Example |
| | I1 | — | 2.1 | Zn—Ni coating | Example |
| | J1 | — | 1.7 | Zn—Ni coating | Example |
| | K1 | — | 2.1 | Zn—Ni coating | Comparative Example |
| | L1 | B: 4.8 | 2.5 | Zn—Ni coating | Comparative Example |
| | M1 | — | 2.9 | Bare | Example |
| | N1 | — | 1.9 | Zn—Ni coating | Example |
| | O1 | — | 2.7 | Zn—Ni coating | Example |
| | P1 | — | 2.8 | Zn—Ni coating | Example |
| | Q1 | — | 1.4 | Zn—Ni coating | Example |
| | R1 | — | 1.6 | Zn—Ni coating | Example |
| | RA1 | — | 2.5 | Zn—Ni coating | Example |
| | RB1 | — | 2.7 | Zn—Ni coating | Example |
| | RC1 | — | 3.0 | Zn—Ni coating | Example |
| | RD1 | — | 2.1 | Zn—Ni coating | Example |
| | RE1 | — | 2.1 | Zn—Ni coating | Example |
| | RF1 | — | 2.4 | Zn—Ni coating | Example |

*B: Bainite, M: Martensite

TABLE 3

| | | Hot-press heating condition | | | Microstructure of hot-press forming part | | | | |
|---|---|---|---|---|---|---|---|---|---|
| Press forming part ID | Steel sheet ID | Heating temperature T2 (° C.) | Retention time (sec) | Heating method | Martensite volume fraction (%) | Retained austenite volume fraction (%) | Residual microstructure volume fraction (%) | Number of retained austenite grains of 0.3 μm or more in equivalent circular diameter (×10$^5$/mm$^2$) | Prior austenite grain size (μm) |
| 1 | A1 | 878 | 23 | Electric heating furnace | 89.2 | 10.8 | — | 4.7 | 28.1 |
| 2 | A2 | 878 | 23 | Electric heating furnace | 89.2 | 10.8 | — | 1.3 | 42.0 |
| 3 | A3 | 878 | 23 | Electric heating furnace | 97.7 | 2.3 | — | 12 | 32.5 |
| 4 | A4 | 750 | 23 | Electric heating furnace | 63.0 | 37.0 | — | 2.9 | 22.4 |
| 5 | A5 | 1050 | 23 | Electric heating furnace | 97.8 | 2.2 | — | 1.1 | 30.4 |
| 6 | B1 | 886 | 21 | Electric heating furnace | 91.0 | 9.0 | — | 3.7 | 50.4 |
| 7 | B2 | 886 | 5 | Electric heating furnace | 89.7 | 10.3 | — | 1.2 | 71.3 |
| 8 | B3 | 886 | 915 | Electric heating furnace | 97.9 | 2.1 | — | 1.1 | 67.3 |
| 9 | B4 | 886 | 21 | Electric heating furnace | 98.0 | 2.0 | — | 1.2 | 29.8 |
| 10 | C1 | 943 | 16 | Electric heating furnace | 89.1 | 10.9 | — | 4.7 | 35.0 |
| 11 | D1 | 911 | 27 | Electric heating furnace | 90.7 | 9.3 | — | 3.3 | 45.9 |
| 12 | E1 | 855 | 29 | Electric heating furnace | 90.4 | 9.6 | — | 2.1 | 28.1 |

TABLE 3-continued

| | | | | | | | | | |
|---|---|---|---|---|---|---|---|---|---|
| 13 | F1 | 860 | 23 | Electric heating furnace | 88.2 | 11.8 | — | 2.9 | 46.1 |
| 14 | G1 | 869 | 21 | Electric heating furnace | 86.1 | 13.9 | — | 4.8 | 50.6 |
| 15 | H1 | 853 | 23 | Electric heating furnace | 84.3 | 15.7 | — | 4.0 | 53.8 |
| 16 | I1 | 893 | 429 | Electric heating furnace | 91.2 | 8.8 | — | 3.7 | 30.7 |
| 17 | J1 | 860 | 401 | Electric heating furnace | 89.9 | 10.1 | — | 2.5 | 24.8 |
| 18 | K1 | 911 | 418 | Electric heating furnace | 93.6 | 6.4 | — | 4.1 | 31.2 |
| 19 | L1 | 894 | 310 | Electric heating furnace | 89.7 | 10.3 | — | 1.1 | 66.9 |
| 20 | M1 | 858 | 566 | Electric heating furnace | 87.6 | 12.4 | — | 4.6 | 28.2 |
| 21 | N1 | 912 | 681 | Electric heating furnace | 88.1 | 11.9 | — | 4.4 | 66.7 |
| 22 | O1 | 940 | 155 | Electric heating furnace | 89.6 | 10.4 | — | 4.9 | 61.6 |
| 23 | P1 | 894 | 73 | Electric heating furnace | 86.8 | 13.2 | — | 4.5 | 29.1 |
| 24 | Q1 | 917 | 501 | Electric heating furnace | 89.9 | 10.1 | — | 4.0 | 67.3 |
| 25 | R1 | 883 | 38 | Direct electric heating | 87.7 | 12.3 | — | 2.1 | 62.4 |
| 25-1 | RA1 | 891 | 35 | Electric heating furnace | 81.4 | 18.6 | — | 5.0 | 14.4 |
| 25-2 | RB1 | 920 | 13 | Electric heating furnace | 84.5 | 15.5 | — | 3.0 | 3.6 |
| 25-3 | RC1 | 922 | 93 | Electric heating furnace | 81.1 | 18.9 | — | 2.8 | 12.5 |
| 25-4 | RD1 | 853 | 13 | Electric heating furnace | 81.0 | 19.0 | — | 4.9 | 9.7 |
| 25-5 | RE1 | 914 | 72 | Electric heating furnace | 86.5 | 13.5 | — | 4.5 | 14.8 |
| 25-6 | RF1 | 915 | 94 | Electric heating furnace | 82.8 | 17.2 | — | 4.8 | 7.9 |

| | Mechanical properties of hot-press forming part | | | | | Delayed fracture resistance evaluation | | |
|---|---|---|---|---|---|---|---|---|
| Press forming part ID | YS (MPa) | TS (MPa) | Uniform elongation (%) | Total elongation (%) | Oxidized scale | Applied stress (MPa) | Evaluation result | Remarks |
| 1 | 1041 | 1911 | 9.0 | 12.9 | Not present | 937 | Good | Example |
| 2 | 1025 | 1916 | 4.3 | 6.6 | Not present | 923 | Poor | Comparative Example |
| 3 | 1047 | 1922 | 4.5 | 7.8 | Not present | 942 | Poor | Comparative Example |
| 4 | 636 | 1250 | 20.5 | 23.7 | Not present | 572 | Good | Comparative Example |
| 5 | 1010 | 1908 | 4.4 | 7.5 | Not present | 909 | Poor | Comparative Example |
| 6 | 1178 | 2148 | 8.5 | 12.4 | Not present | 1060 | Good | Example |
| 7 | 1204 | 2173 | 8.6 | 11.3 | Not present | 1084 | Poor | Comparative Example |
| 8 | 1209 | 2186 | 4.4 | 7.8 | Not present | 1088 | Poor | Comparative Example |
| 9 | 1210 | 2158 | 4.4 | 7.5 | Not present | 1089 | Poor | Comparative Example |
| 10 | 1259 | 2493 | 4.5 | 7.7 | Not present | 1133 | Poor | Comparative Example |
| 11 | 996 | 1966 | 8.4 | 11.1 | Not present | 896 | Good | Example |
| 12 | 891 | 1730 | 8.9 | 12.9 | Not present | 802 | Good | Comparative Example |
| 13 | 1229 | 2248 | 9.6 | 12.6 | Present | 1106 | Good | Example |
| 14 | 1375 | 2214 | 10.1 | 13.1 | Not present | 1237 | Good | Example |
| 15 | 1516 | 3020 | 4.2 | 7.5 | Not present | 1364 | Poor | Comparative Example |
| 16 | 1040 | 2061 | 8.4 | 10.8 | Not present | 936 | Good | Example |
| 17 | 963 | 1880 | 8.4 | 12.1 | Not present | 867 | Good | Example |
| 18 | 892 | 1733 | 7.6 | 10.8 | Not present | 803 | Good | Comparative Example |
| 19 | 988 | 1975 | 8.8 | 12.7 | Not present | 890 | Poor | Comparative Example |
| 20 | 1093 | 2155 | 8.9 | 12.9 | Present | 983 | Good | Example |
| 21 | 1054 | 2071 | 9.8 | 13.2 | Not present | 949 | Good | Example |
| 22 | 1103 | 2165 | 8.6 | 11.5 | Not present | 993 | Good | Example |

TABLE 3-continued

| | | | | | | | | |
|---|---|---|---|---|---|---|---|---|
| 23 | 1264 | 2244 | 9.6 | 11.9 | Not present | 1138 | Good | Example |
| 24 | 1243 | 2206 | 9.0 | 11.7 | Not present | 1119 | Good | Example |
| 25 | 1169 | 2110 | 9.8 | 13.6 | Not present | 1052 | Good | Example |
| 25-1 | 1006 | 1997 | 11.4 | 13.9 | Not present | 905 | Excellent | Example |
| 25-2 | 1081 | 2158 | 10.4 | 12.9 | Not present | 973 | Excellent | Example |
| 25-3 | 984 | 1966 | 11.2 | 13.6 | Not present | 885 | Excellent | Example |
| 25-4 | 1045 | 2016 | 11.0 | 14.9 | Not present | 941 | Excellent | Example |
| 25-5 | 1034 | 2055 | 9.4 | 13.3 | Not present | 931 | Excellent | Example |
| 25-6 | 1108 | 2207 | 11.1 | 14.3 | Not present | 997 | Excellent | Example |

TABLE 4

| | Chemical composition | | | | | | | | | |
|---|---|---|---|---|---|---|---|---|---|---|
| Steel ID | C (mass %) | Mn (mass %) | Si (mass %) | P (mass %) | S (mass %) | Al (mass %) | N (mass %) | Others (mass %) | $Ac_1$ point (° C.) | $Ac_3$ point (° C.) | Remarks |
| S | 0.258 | 4.22 | 0.14 | 0.0023 | 0.0035 | 0.039 | 0.0047 | Ni: 0.02 | 630 | 796 | Conforming steel |
| T | 0.263 | 5.66 | 0.23 | 0.0016 | 0.0030 | 0.032 | 0.0033 | Cu: 0.01 | 591 | 794 | Conforming steel |
| U | 0.248 | 5.53 | 0.16 | 0.0014 | 0.0031 | 0.036 | 0.0037 | Cr: 0.30 | 598 | 798 | Conforming steel |
| V | 0.237 | 4.13 | 0.08 | 0.0014 | 0.0030 | 0.044 | 0.0033 | Mo: 0.32 | 633 | 798 | Conforming steel |
| W | 0.248 | 5.51 | 0.25 | 0.0020 | 0.0016 | 0.033 | 0.0036 | Ti: 0.03 | 595 | 798 | Conforming steel |
| X | 0.257 | 5.27 | 0.14 | 0.0013 | 0.0033 | 0.034 | 0.0031 | Nb: 0.02 | 601 | 793 | Conforming steel |
| AA | 0.255 | 4.71 | 0.35 | 0.0020 | 0.0026 | 0.028 | 0.0032 | V: 0.01 | 619 | 804 | Conforming steel |
| AB | 0.270 | 5.91 | 0.28 | 0.0014 | 0.0012 | 0.026 | 0.0045 | W: 0.03 | 584 | 793 | Conforming steel |
| AC | 0.255 | 5.75 | 0.11 | 0.0013 | 0.0025 | 0.034 | 0.0047 | Ti: 0.02 B: 0.002 | 587 | 789 | Conforming steel |
| AD | 0.235 | 5.82 | 0.05 | 0.0024 | 0.0030 | 0.031 | 0.0026 | Ti: 0.02 B: 0.002 | 585 | 790 | Conforming steel |
| AE | 0.246 | 5.98 | 0.02 | 0.0016 | 0.0022 | 0.036 | 0.0021 | REM: 0.001 | 580 | 787 | Conforming steel |
| AF | 0.255 | 4.27 | 0.09 | 0.0014 | 0.0010 | 0.031 | 0.0034 | B: 0.0025 | 629 | 795 | Conforming steel |
| AG | 0.236 | 5.07 | 0.10 | 0.0014 | 0.0031 | 0.032 | 0.0045 | Ca: 0.003 | 606 | 796 | Conforming steel |
| AH | 0.267 | 4.96 | 0.05 | 0.0021 | 0.0021 | 0.043 | 0.0021 | Mg: 0.004 | 608 | 788 | Conforming steel |
| AI | 0.250 | 5.73 | 0.31 | 0.0014 | 0.0030 | 0.040 | 0.0050 | Sb: 0.010 | 590 | 800 | Conforming steel |

TABLE 5

| | | Hot rolling condition | Annealing condition | | Microstructure of steel sheet for hot press | | | | | |
|---|---|---|---|---|---|---|---|---|---|---|
| Steel sheet ID | Steel ID | Cumulative reduction ratio in temperature range of 950° C. or more in finish rolling (%) | $Ac_1$ point −150 (° C.) | Heating temperature T1 (° C.) | Retention time (hr) | Ferrite phase volume fraction (%) | Cementite volume fraction (%) | Residual microstructure volume fraction (%) | Mnθ/Mnα | Steel sheet surface treatment | Remarks |
| S1 | S | 43 | 480 | 580 | 2.5 | 96.5 | 3.5 | — | 1.9 | Zn—Ni coating | Example |
| T1 | T | 50 | 441 | 533 | 1.7 | 95.8 | 4.2 | — | 2.0 | Zn—Ni coating | Example |
| U1 | U | 38 | 448 | 562 | 2.9 | 96.9 | 3.1 | — | 2.2 | Zn—Ni coating | Example |
| V1 | V | 45 | 483 | 580 | 1.8 | 96.0 | 4.0 | — | 1.8 | Zn—Ni coating | Example |
| W1 | W | 41 | 445 | 547 | 2.4 | 96.1 | 3.9 | — | 1.5 | Zn—Ni coating | Example |
| X1 | X | 40 | 451 | 550 | 1.6 | 98.0 | 2.0 | — | 3.0 | Zn—Ni coating | Example |
| AA1 | AA | 49 | 469 | 565 | 2.1 | 95.7 | 4.3 | — | 1.6 | Zn—Ni coating | Example |
| AB1 | AB | 41 | 434 | 530 | 2.1 | 95.3 | 4.7 | — | 2.1 | Zn—Ni coating | Example |
| AC1 | AC | 39 | 437 | 578 | 1.9 | 97.3 | 2.7 | — | 2.8 | Zn—Ni coating | Example |
| AD1 | AD | 37 | 435 | 580 | 2.2 | 98.0 | 2.0 | — | 2.1 | Zn—Ni coating | Example |
| AE1 | AE | 59 | 430 | 535 | 3.0 | 98.8 | 1.2 | — | 2.0 | Zn—Ni coating | Example |

TABLE 5-continued

| | | Hot rolling condition | Annealing condition | | | Microstructure of steel sheet for hot press | | | | | |
|---|---|---|---|---|---|---|---|---|---|---|---|
| Steel sheet ID | Steel ID | Cumulative reduction ratio in temperature range of 950° C. or more in finish rolling (%) | $Ac_1$ point −150 (° C.) | Heating temperature T1 (° C.) | Retention time (hr) | Ferrite phase volume fraction (%) | Cementite volume fraction (%) | Residual micro-structure volume fraction (%) | Mnθ/Mnα | Steel sheet surface treatment | Remarks |
| AF1 | AF | 53 | 479 | 588 | 1.7 | 97.8 | 2.2 | — | 2.0 | Zn—Ni coating | Example |
| AG1 | AG | 46 | 456 | 555 | 2.7 | 98.9 | 1.1 | — | 2.8 | Zn—Ni coating | Example |
| AH1 | AH | 40 | 458 | 560 | 2.2 | 97.7 | 2.3 | — | 2.3 | Zn—Ni coating | Example |
| AI1 | AI | 47 | 440 | 545 | 2.6 | 98.4 | 1.6 | — | 2.5 | Zn—Ni coating | Example |

TABLE 6

| | | Hot-press heating condition | | | Microstructure of hot-press forming part | | | | |
|---|---|---|---|---|---|---|---|---|---|
| Press forming part ID | Steel sheet ID | Heating temperature T2 (° C.) | Retention time (sec) | Heating method | Martensite volume fraction (%) | Retained austenite volume fraction (%) | Residual microstructure volume fraction (%) | Number of retained austenite grains of 0.3 μm or more in equivalent circular diameter (×$10^5$/mm$^2$) | Prior austenite grain size (μm) |
| 26 | S1 | 892 | 34 | Electric heating furnace | 88.2 | 11.8 | — | 3.9 | 28.3 |
| 27 | T1 | 923 | 89 | Electric heating furnace | 85.8 | 14.2 | — | 2.5 | 56.9 |
| 28 | U1 | 936 | 98 | Electric heating furnace | 90.3 | 9.7 | — | 2.4 | 68.1 |
| 29 | V1 | 902 | 14 | Electric heating furnace | 91.1 | 8.9 | — | 3.1 | 49.1 |
| 30 | W1 | 886 | 53 | Electric heating furnace | 86.6 | 13.4 | — | 3.7 | 31.3 |
| 31 | X1 | 908 | 83 | Electric heating furnace | 89.2 | 10.8 | — | 4.7 | 48.7 |
| 32 | AA1 | 911 | 79 | Electric heating furnace | 90.3 | 9.7 | — | 2.7 | 31.9 |
| 33 | AB1 | 931 | 51 | Electric heating furnace | 85.4 | 14.6 | — | 2.4 | 69.0 |
| 34 | AC1 | 886 | 68 | Electric heating furnace | 88.7 | 11.3 | — | 2.1 | 75.6 |
| 35 | AD1 | 856 | 9 | Electric heating furnace | 86.7 | 13.3 | — | 4.7 | 70.4 |
| 36 | AE1 | 879 | 21 | Electric heating furnace | 85.8 | 14.2 | — | 2.8 | 49.3 |
| 37 | AF1 | 874 | 17 | Electric heating furnace | 87.5 | 12.5 | — | 2.5 | 44.9 |
| 38 | AG1 | 919 | 69 | Electric heating furnace | 87.5 | 12.5 | — | 2.6 | 23.0 |
| 39 | AH1 | 934 | 43 | Electric heating furnace | 90.6 | 9.4 | — | 4.4 | 56.3 |
| 40 | AI1 | 892 | 33 | Electric heating furnace | 88.4 | 11.6 | — | 2.7 | 28.3 |

| Press forming part ID | Mechanical properties of hot-press forming part | | | | Delayed fracture resistance evaluation | | | |
|---|---|---|---|---|---|---|---|---|
| | YS (MPa) | TS (MPa) | Uniform elongation (%) | Total elongation (%) | Oxidized scale | Applied stress (MPa) | Evaluation result | Remarks |
| 26 | 983 | 2020 | 9.6 | 12.9 | Not present | 884 | Good | Example |
| 27 | 992 | 2229 | 9.5 | 13.0 | Not present | 893 | Good | Example |
| 28 | 1022 | 2144 | 8.4 | 11.9 | Not present | 920 | Good | Example |
| 29 | 1021 | 1907 | 8.7 | 10.7 | Not present | 919 | Good | Example |
| 30 | 1103 | 2173 | 9.2 | 12.5 | Not present | 993 | Good | Example |
| 31 | 1136 | 2170 | 9.2 | 12.8 | Not present | 1023 | Good | Example |
| 32 | 1041 | 2086 | 8.7 | 12.5 | Not present | 937 | Good | Example |
| 33 | 1116 | 2208 | 9.9 | 12.2 | Not present | 1004 | Good | Example |
| 34 | 1022 | 2222 | 9.0 | 11.7 | Not present | 920 | Good | Example |
| 35 | 1090 | 2156 | 9.8 | 13.2 | Not present | 981 | Good | Example |
| 36 | 1181 | 2223 | 9.9 | 13.1 | Not present | 1063 | Good | Example |
| 37 | 1078 | 2004 | 8.9 | 12.4 | Not present | 970 | Good | Example |
| 38 | 1135 | 2051 | 9.8 | 12.0 | Not present | 1022 | Good | Example |

TABLE 6-continued

| | | | | | | | | |
|---|---|---|---|---|---|---|---|---|
| 39 | 1032 | 2185 | 8.8 | 12.7 | Not present | 928 | Good | Example |
| 40 | 1193 | 2210 | 9.5 | 11.8 | Not present | 1074 | Good | Example |

As shown in Tables 3 and 6, all Examples exhibited high strength of a tensile strength TS of 1800 MPa or more and high ductility of a uniform elongation uEl of 6.0% or more, and also exhibited excellent delayed fracture resistance. On the other hand, Comparative Examples failed to satisfy at least one of the properties.

INDUSTRIAL APPLICABILITY

The presently disclosed hot-press forming part is suitable as a structural member required to have high crash energy absorption performance and excellent delayed fracture resistance such as an impact beam, a centre pillar, or a bumper of an automobile, and therefore is industrially very useful.

The invention claimed is:

1. A hot-press forming part, comprising:
a chemical composition containing, in mass %,
C: 0.180% or more and less than 0.300%,
Mn: 4.15% or more and less than 11.0%,
Si: 0.01% to 1.5%,
P: 0.05% or less,
S: 0.05% or less,
Al: 0.005% to 0.1%, and
N: 0.01% or less,
with a balance consisting of Fe and inevitable impurities; and
a microstructure that includes martensite of 70.0% or more in volume fraction and retained austenite of 3.0% or more and 30.0% or less in volume fraction and in which the number of retained austenite grains of 0.3 μm or more in equivalent circular diameter is $2.0 \times 10^5 / mm^2$ or more.

2. The hot-press forming part according to claim 1, wherein the chemical composition further contains, in mass %, one or more groups selected from
A group: one or more selected from Ni: 0.01% to 5.0%, Cu: 0.01% to 5.0%, Cr: 0.01% to 5.0%, and Mo: 0.01% to 3.0%,
B group: one or more selected from Ti: 0.005% to 3.0%, Nb: 0.005% to 3.0%, V: 0.005% to 3.0%, and W: 0.005% to 3.0%,
C group: one or more selected from REM: 0.0005% to 0.01%, Ca: 0.0005% to 0.01%, and Mg: 0.0005% to 0.01%,
D group: Sb: 0.002% to 0.03%, and
E group: B: 0.0005% to 0.05%.

3. The hot-press forming part according to claim 1, comprising
a coating layer on a surface thereof.

4. The hot-press forming part according to claim 2, comprising
a coating layer on a surface thereof.

5. A method of manufacturing a hot-press forming part, comprising:
heating, as a blank sheet, a steel sheet to a temperature range of $Ac_3$ point or more and 1000° C. or less, the steel sheet including: a chemical composition containing, in mass %,
C: 0.180% or more and less than 0.300%,
Mn: 4.15% or more and less than 11.0%,
Si: 0.01% to 1.5%,
P: 0.05% or less,
S: 0.05% or less,
Al: 0.005% to 0.1%, and
N: 0.01% or less,
with a balance consisting of Fe and inevitable impurities; and a microstructure that includes ferrite and cementite and in which Mnθ/Mnα is 1.4 or more, where Mnα is a Mn concentration of the ferrite and Mnθ is a Mn concentration of the cementite;
retaining the steel sheet in the temperature range for 10 sec or more and 900 sec or less; and
thereafter performing press forming and hardening simultaneously on the steel sheet using a tool for press forming, to obtain a hot-press forming part including a microstructure that includes martensite of 70.0% or more in volume fraction and retained austenite of 3.0% or more and 30.0% or less in volume fraction and in which the number of retained austenite grains of 0.3 μm or more in equivalent circular diameter is $2.0 \times 10^5 / mm^2$ or more.

6. The method of manufacturing a hot-press forming part according to claim 5,
wherein the chemical composition further contains, in mass %, one or more groups selected from
A group: one or more selected from Ni: 0.01% to 5.0%, Cu: 0.01% to 5.0%, Cr: 0.01% to 5.0%, and Mo: 0.01% to 3.0%,
B group: one or more selected from Ti: 0.005% to 3.0%, Nb: 0.005% to 3.0%, V: 0.005% to 3.0%, and W: 0.005% to 3.0%,
C group: one or more selected from REM: 0.0005% to 0.01%, Ca: 0.0005% to 0.01%, and Mg: 0.0005% to 0.01%,
D group: Sb: 0.002% to 0.03%, and
E group: B: 0.0005% to 0.05%.

7. The method of manufacturing a hot-press forming part according to claim 5,
wherein the steel sheet has a coating layer on a surface thereof.

8. The method of manufacturing a hot-press forming part according to claim 6,
wherein the steel sheet has a coating layer on a surface thereof.

* * * * *